US 9,508,238 B2

(12) United States Patent
Zeng et al.

(10) Patent No.: US 9,508,238 B2
(45) Date of Patent: Nov. 29, 2016

(54) ELECTRONIC ARTICLE SURVEILLANCE PORTAL

(71) Applicant: Checkpoint Systems, Inc., Thorofare, NJ (US)

(72) Inventors: Kefeng Zeng, West Deptford, NJ (US); Ronald Decker, Turnersville, NJ (US); Nimesh Shah, Marlton, NJ (US); Brennan Bradley, Chadds Ford, PA (US)

(73) Assignee: CHECKPOINT SYSTEMS, INC., Thorofare, NJ (US)

( * ) Notice: Subject to any disclaimer, the term of this patent is extended or adjusted under 35 U.S.C. 154(b) by 5 days.

(21) Appl. No.: 14/211,529

(22) Filed: Mar. 14, 2014

(65) Prior Publication Data

US 2014/0266728 A1    Sep. 18, 2014

Related U.S. Application Data

(60) Provisional application No. 61/788,534, filed on Mar. 15, 2013.

(51) Int. Cl.
| | |
|---|---|
| *G08B 13/14* | (2006.01) |
| *G08B 13/24* | (2006.01) |
| *G06K 7/10* | (2006.01) |

(52) U.S. Cl.
CPC ....... *G08B 13/2431* (2013.01); *G06K 7/10356* (2013.01); *G06K 7/10445* (2013.01);
(Continued)

(58) Field of Classification Search
CPC ................... G08B 13/2431; G06K 19/07749
USPC ........................................... 340/572.1–572.8
See application file for complete search history.

(56) References Cited

U.S. PATENT DOCUMENTS 3,849,633 A * 11/1974 Reitboeck ................. B07C 3/12
                                              209/3.3
5,142,292 A   8/1992 Chang
(Continued)

FOREIGN PATENT DOCUMENTS

CN    1963837 A    5/2007
NL    1030233      4/2007

OTHER PUBLICATIONS

Examination Report of corresponding European Application No. EP 14160026.2, mailed Sep. 24, 2015, all enclosed pages cited.
(Continued)

*Primary Examiner* — Eric M Blount
(74) *Attorney, Agent, or Firm* — Nelson Mullins Riley & Scarborough, LLP

(57) ABSTRACT

A system and device for detecting and/or deactivating a security tag when passing through an electronic article surveillance (EAS) portal. The portal may be oriented by the arrangement of one or more antennas to generate an electromagnetic field at or within the portal to detect and/or deactivate the security tag. The electromagnetic field may detect and/or deactivate a security tag located at any orientation on merchandise as the security tag passes through the portal. The portal may be mounted on a counter at a point-of-sale station in which merchandise having security tags attached thereto are passed through the portal. The portal may also be mounted to a floor in which a shopping cart having merchandise is passed through the portal so that security tags attached to the merchandise in the cart are detected and/or deactivated.

18 Claims, 14 Drawing Sheets

(52) U.S. Cl.
CPC ......... *G08B13/242* (2013.01); *G08B 13/2411* (2013.01); *G08B 13/2425* (2013.01); *G08B 13/2474* (2013.01); *G08B 13/246* (2013.01)

(56) References Cited

U.S. PATENT DOCUMENTS

| | | | | |
|---|---|---|---|---|
| 5,327,118 | A * | 7/1994 | Drucker et al. | 340/572.7 |
| 5,917,412 | A | 6/1999 | Martin | |
| 5,973,606 | A * | 10/1999 | Maitin et al. | 340/676 |
| 6,497,362 | B2 * | 12/2002 | Persky et al. | 235/383 |
| 6,837,428 | B2 * | 1/2005 | Lee et al. | 235/383 |
| 6,965,316 | B2 * | 11/2005 | Rapp et al. | 340/571 |
| 7,126,478 | B2 | 10/2006 | Rapp et al. | |
| 7,559,467 | B2 * | 7/2009 | Scheb | 235/383 |
| 7,920,063 | B2 * | 4/2011 | Ulrich | 340/572.1 |
| 2007/0013514 | A1 | 1/2007 | Rapp et al. | |
| 2007/0102513 | A1 | 5/2007 | Scheb | |
| 2007/0210922 | A1 * | 9/2007 | Clifford | G07G 1/0045 340/572.3 |
| 2007/0229280 | A1 | 10/2007 | Akiguchi | |
| 2008/0309491 | A1 * | 12/2008 | Gillard et al. | 340/572.1 |
| 2009/0212952 | A1 * | 8/2009 | Yang | 340/572.3 |
| 2012/0223141 | A1 * | 9/2012 | Good | G06K 7/10722 235/455 |

OTHER PUBLICATIONS

"UHF, Auto-ID Class 1b, comtactless memory IC 96 bit ePC with inventory and kill function," Data Briefing, Aug. 2013, pp. 1-4, issue XRA00, STMicroelectronics Group of Companies.

\* cited by examiner

ELECTRONIC ARTICLE SURVEILLANCE PORTAL

CROSS REFERENCE TO RELATED APPLICATIONS

The present application is related to U.S. Provisional Patent Application Ser. No. 61/788,534 entitled ELECTRONIC ARTICLE SURVEILLANCE PORTAL filed on Mar. 15, 2013, the contents of which are incorporated fully herein by reference.

FIELD OF THE INVENTION

This disclosure generally relates to the field of security tags, and more particularly, to a system, device, and method for detecting and/or deactivating security tags at any orientation by passing the security tag through a portal.

BACKGROUND

One way of providing security for merchandise in a retail facility is the use of traditional electronic article surveillance (EAS) systems. Such systems include a transponder, that normally takes the form of an electromagnetically responsive element enclosed in the security tag and is affixed to each article of merchandise to protect the article from theft and for detection at an EAS detection gate. Security tags, also referred to as "EAS security tags", may be a hard tag or a soft tag. Hard tags include the transponder within an enclosure or housing that can be detached from the article it is protecting and typically re-used. The enclosure is typically a hard plastic case. Soft tags, on the other hand, may be a label (e.g., a sticker, care-label, content label, paper hang-tag, etc.) and are typically planar in form. The soft tag may be a plastic label, paper tag, sleeve of fabric, etc.

This disclosure is directed to deactivatable soft tags, hence herein subsequently described as "security tags". The term "security tag" as used in this disclosure covers all types of soft deactivatable security tags, including EAS security tags, including RFID security tags. The responsive element, or transponder, in the security tag may be a strip of ferro-magnetic material, a section of acoustomagnetostrictive metallic glass, a parallel resonant circuit made with a capacitor and an inductor, a strip antenna connected to a diode, or an antenna coupled with a radio frequency identification (RFID) integrated circuit, i.e., an RFID security tag. These technologies, termed EM, AM, RF, RFID and microwave, respectively, normally operate at a characteristic frequency determined by a combination of regulatory and historical reasons. The detection device, for detecting the security tag, consists of a detection antenna connected to both a transmitter and a receiver. The transmitter is arranged to provide a stimulating signal to the transponder of the security tag. The receiver is arranged to determine whether the transponder is near the detector. For RFID security tag detection, RFID readers are used. Typically, detection devices are used to sound an alarm if a transponder is detected by the device located at a point of egress.

When merchandise is purchased, the security tags may either be removed or deactivated by the application of special electromagnetic fields. Typically in the U.S., such EAS anti-theft security systems for RF use 8.2 MHz and associated 8.2 MHz security tags whereas RFID anti-theft security systems use 13.56 MHz, 900 MHz or 2.4 GHz+ along with the associated RFID security tags. EAS anti-theft security systems for AM use 58 KHz and associated 58 KHz security tags.

Security tags are often deactivated at the point-of-purchase by an antenna embedded into a counter top or about a scan window in the counter top so that the security tags will not later be detected by the detecting device at the store exit, at the point of egress. The antennas lay horizontal in the counter top or about the scan window, and thus in parallel with the counter top. An antenna may also be positioned in a wall orthogonal to the point-of-purchase counter top, or vertical scan window. The antennas are often shaped in a rectangular pattern and detect and/or deactivate the security tag as the tag is passed over the plane in which the antenna resides.

Depending on the placement of the security tag about the product for purchase, the security tag may not be detected or deactivated when the product is passed over the plane, wherein the antenna resides. To attain detection or deactivation, the store clerk often has to attempt to locate the security tag and then rotate the merchandise so that the largest surface area of the tag faces the plane in which the antenna resides. Other times the store clerk will repeatedly rotate the merchandise and swipe the product over the plane, in which the antenna resides, in the hopes to detect or deactivate the security tag. This often occurs when the security tag is hidden inside merchandise, such as inside a box containing the merchandise. The security tag is hidden so that potential thieves do not remove the tag before exiting the store so as not to set off alarms. Hidden tags increase the difficulty of aligning the security tag so as to face the largest surface area of the tag to the plane, in which the antenna resides, to detect or deactivate the tag.

As the store clerk fails to deactivate the tag and repeatedly attempts to deactivate, the customer becomes agitated and the customer lines grow at the point-of-sale station. If the store clerk fails to deactivate the security tag, or gives up, then alarms occur when the customer passes through the security tag detection gates at the store exit. Then, typically another store employee has to recheck the merchandise bought by the customer, often prolonging a customer's stay at the store post purchase and often leading to customer anger or embarrassment. If the security tags are consistently not deactivated, store personnel end up often simply waiving store patrons through the detection gates, thus ignoring the alarms at the detection gates.

What is needed is a system and method to detect and/or deactivate a security tag at any orientation, without requiring the rotation of merchandise until the largest surface area of the security tag is found and aligned to face the plane in which a detection/deactivation antenna resides, to detect and/or deactivate the tag. Passing a tag through a detection/deactivation portal will eliminate the necessity of having to rotate merchandise and/or locate the security tag on the merchandise so as to properly detect and/or deactivate the security tag. Deactivation of the security tag at the point-of-sale station, through a portal, will eliminate wait time for the customer at the register and any additional wait and/or embarrassment caused when the customer's merchandise has to be re-checked after sale upon setting off security alarms at the detection gates for failure to deactivate at the point-of-sale station.

SUMMARY

Embodiments of this disclosure are directed to an EAS system and portal in which a security tag passes through the portal for detection and/or deactivation. The portal may be oriented by the arrangement of one or more antennas (sometimes known as a first antenna, second antenna, etc.) of which generate an electromagnetic field about the portal to detect and/or deactivate the security tag. The electromagnetic field may detect and/or deactivate a security tag located in any orientation about or within merchandise as the tag passes through the portal.

Embodiments of this disclosure are directed to an electronic article surveillance (EAS) system. The electronic article surveillance (EAS) system includes at least one security tag affixed to an article. The electronic article surveillance (EAS) system also includes a current generator (sometimes known as a first current generator, etc.). The electronic article surveillance (EAS) system also includes an antenna coupled to the current generator to generate an electromagnetic field. The antenna is configured to form a passageway about one or more planes of which the antenna borders so that the article passes through the passageway. The electromagnetic field is used for at least one of sensing to detect the security tag or deactivating the security tag about the passageway.

According to one embodiment, the current generator is coupled to the antenna by a pair of generator leads. The current generator is configured to drive current to flow from one generator lead through the antenna to the other generator lead to generate the electromagnetic field about the antenna.

According to one embodiment, the electronic article surveillance (EAS) system also includes an additional antenna coupled to the current generator or an additional current generator to partially generate a portion of the electromagnetic field. The additional antenna is configured about one or more planes of which the additional antenna borders.

According to one embodiment, the additional antenna is further configured to partially form the passageway about the one or more planes of which the additional antenna borders. The one or more planes bordered by the antenna and the one or more planes bordered by the additional antenna are parallel to one another. The article passes through the passageway formed by both the antenna and the additional antenna.

According to one aspect of one embodiment, the antenna and the additional antenna are configured to be driven out-of-phase to improve far field cancellation of the electromagnetic field.

According to another aspect of one embodiment, the electromagnetic field of the antenna deactivates the tag and the portion of the electromagnetic field of the additional antenna senses to detect the security tag.

According to another embodiment, the additional antenna is configured to partially form the passageway about the one or more planes of which the additional antenna borders. The one or more planes bordered by the antenna and the one or more planes bordered by the additional antenna cross one another. The article passes through the passageway formed by both the antenna and the additional antenna.

According to another embodiment, the one or more planes bordered by the antenna and the one or more planes bordered by the additional antenna are perpendicular to one another. The article passes over the additional antenna and through the passageway formed by the antenna. According to one aspect of one embodiment, a portion of the antenna and a portion of the additional antenna are adjoined.

According to one embodiment, the electronic article surveillance (EAS) system also includes a conveyance system to transfer the article through the passageway.

According to one aspect of one embodiment, the conveyance system is located on any one of a counter top or a floor. The passageway is large enough to allow for a shopping cart to pass through the passageway when the conveyance system is located on the floor.

According to another aspect of one embodiment, the electronic article surveillance (EAS) system also includes a direction detector configured to determine at least one of a direction of travel or a speed of the conveyance system.

According to one embodiment, the electronic article surveillance (EAS) system also includes a controller coupled to the direction detector and the current generator. The controller is configured to modify the operation of the current generator based on at least one of the direction of travel or the speed of the conveyance system determined by the direction director.

According to another embodiment, the electronic article surveillance (EAS) also includes a controller coupled to the direction detector and the conveyance system. The controller is configured to modify the operation of the conveyance system based on at least one of the direction of travel or the speed of the conveyance system determined by the direction director.

According to another embodiment, the electronic article surveillance (EAS) system also includes a controller coupled to the conveyance system and the antenna. The controller is configured to modify the operation of the conveyance system based on at least one of detection of the security tag or deactivation of the security tag.

According to one embodiment, the electronic article surveillance (EAS) system also includes a housing to support the at least one antenna. The housing is shielded to absorb at least a portion of the electromagnetic field.

According to one aspect of one embodiment, the housing further supports a scanner that scans a barcode on the article at approximately the same time that the article passes through the passageway.

Embodiments of this disclosure are directed to an electronic article surveillance (EAS) portal. The portal includes an antenna configured to form a passageway about one or more planes of which the antenna borders for a security tag to pass through. The antenna is further configured to emit an electromagnetic field for at least one of detecting the security tag or deactivating the security tag.

According to one embodiment, the antenna is coupled to a current generator by a pair of generator leads. The current generator is configured to drive current to flow from one generator lead through the antenna to the other generator lead to generate the electromagnetic field emitted by the antenna.

According to one embodiment, the electronic article surveillance (EAS) portal also includes an additional antenna. The additional antenna is configured about one or more planes of which the additional antenna borders.

According to one embodiment, the additional antenna is coupled to the current generator or an additional current generator to generate a portion of the electromagnetic field of which the additional antenna is configured to emit for at least one of detecting the security tag or deactivating the security tag.

According to one embodiment, the additional antenna is further configured to partially form the passageway about the one or more planes of which the additional antenna borders. The one or more planes bordered by the antenna and the one or more planes bordered by the additional antenna are parallel to one another. The security tag passes through the passageway formed by both the antenna and the additional antenna.

According to another embodiment, the one or more planes bordered by the antenna and the one or more planes bordered by the additional antenna are perpendicular to one another. The security tag passes over the additional antenna and through the passageway formed by the antenna.

According to another embodiment, the additional antenna is further configured to partially form the passageway about the one or more planes of which the additional antenna borders, wherein the one or more planes bordered by the antenna and the one or more planes bordered by the additional antenna cross one another. The security tag passes through the passageway formed by both the antenna and the additional antenna.

According to one aspect of one embodiment, the electronic article surveillance (EAS) portal also includes a third antenna configured about one or more planes of which the third antenna borders. The third antenna is configured to partially form the passageway about the one or more planes of which the third antenna borders. The portal also includes a fourth antenna configured about one or more planes of which the fourth antenna borders. The fourth antenna is configured to partially form the passageway about the one or more planes of which the fourth antenna borders. The one or more planes bordered by the third antenna and the one or more planes bordered by the fourth antenna cross one another. The security tag passes through the passageway formed by the antenna, the additional antenna, the third antenna, and the fourth antenna.

BRIEF DESCRIPTION OF THE DRAWINGS

The disclosure will be described in conjunction with the following drawings in which like reference numerals designate like elements and wherein.

DETAILED DESCRIPTION OF ILLUSTRATIVE EMBODIMENTS

Figure 1A:
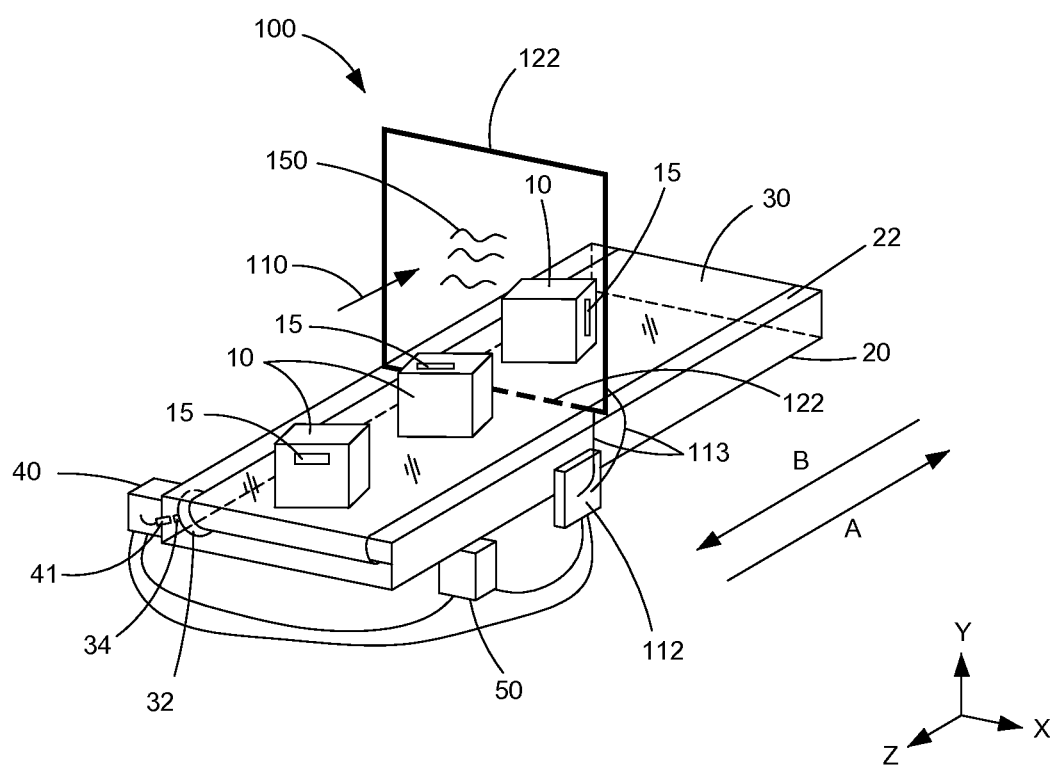
FIG. 1A illustrates a perspective view of a detection/deactivation portal which includes an antenna standing vertically above a counter top according to one embodiment.

The accompanying drawings are intended to provide further understanding of the disclosure and are incorporated in and constitute a part of the description of the disclosure. The drawings illustrate embodiments and together with the description illustrate principles of this disclosure. The drawings should not be taken as implying any necessary limitation on the essential scope of this disclosure. The drawings are given by way of non-limitative example to explain the nature of the disclosure. For a more complete understanding of the disclosure, reference is now made to the following description taken in conjunction with accompanying drawings.

The various features of novelty are pointed out specifically in the claims which are a part of this description. For a better understanding, reference should be made to the drawings and descriptive matter in which there are illustrated and described preferred embodiments.

The disclosure differs from other attempts by detecting and/or deactivating a security tag when the security tag is moved through a detection/deactivation portal, as opposed to being passed over, or moved in a direction parallel to, a plane in which an antenna resides. The disclosure also relies on the standard technology tags (e.g., EAS security tags, including RFID security tags). The term "detection", as for example in "detection/deactivation portal", means the capability to detect, by sensing for the presence of a security tag. The combination of terms in "detection/deactivation" or "detecting/deactivating" means that at least one of the operations of detection or deactivation may take place or that both may occur. A single antenna can either detect, by sensing for the presence of a tag, or deactivate. The single antenna may also both detect and deactivate, wherein for example the current provided to the single antenna is modified at certain stages in a period of time to detect then deactivate or vice versa. Thus, a security tag may travel through an antenna, in which the same antenna detects the security tag and then deactivates the security tag, or vice versa, as the security tag travels through the antenna.

In this disclosure, an antenna detects and/or deactivates live, or active security tags (meaning "non-deactivated security tags") when the security tags are passed through a portal located, for example, at or near a point-of-sale station of a store. The term "portal" is defined as a location in which a security tag passes through and may be sensed for detection and/or deactivated at this location. "Portal" can be EAS portal or a component of an EAS system. The term "electronic article surveillance (EAS)" may be defined as a system or device used in retail security, but may also apply to systems or devices used in merchandise visibility, inventory, for use in warehouses, etc. Once the security tag is deactivated it is no longer active or live. Merchandise scanned for sale, when for example a barcode is read, at the point-of-sale station may continue in a path on, for example, a conveyance system, through the portal so that any and all security tags attached to the article of merchandise may be deactivated. "Article" can be an article of merchandise, or any article of which a security tag may be attached, including inventory articles.

FIG. 1A illustrates a perspective view of a detection/deactivation portal 100 which includes an antenna 122 (sometimes known as a first antenna) standing vertically above a counter top 22. As shown in FIG. 1A, the plane of which the antenna 122 is located, is in the x-y plane based on the x-y-z orientation vectors shown in the bottom right corner of FIG. 1A. The plane in which the antenna 122 is located is shown nearly perpendicular to the plane of the counter top 22, located in the x-z plane. As shown in FIG. 1A, the antenna 122 is formed by four antenna sides, wherein the sides collectively form a square. Between the four sides of the antenna 122 is vacant space, where for example, the article of merchandise 10 may pass through. The sides of the antenna 122 border this vacant space. The counter 20 and conveyance system 30 are shown as transparent so as to view the bottom side of the antenna 122 located below the conveyance system 30 and on the counter top 22. In other embodiments, the bottom side of the antenna 122 may be located in the counter top 22 or below the counter top 22.

The counter 20 is representative of a location where articles of merchandise 10 may be placed before, during, or after the purchase of the articles 10 at or near a point-of-sale station (not shown). The point-of-sale station may or may not be maintained by a store clerk. For example, the point-of-sale station may be a self check-out station, where customers can purchase merchandise on their own with little or no interaction with a store clerk.

In FIG. 1A, only a portion of the counter 20 is shown. As shown, the counter 20 includes a conveyance system 30, which may include, as is shown in the preferred embodiment, a conveyor belt or belts, positioned along the counter top 22 of the counter 20. Conveyance system 30 may also include a controller 50 to control the operation of the conveyance system 30, such as the direction or speed of travel of the conveyor belt. In FIG. 1A, articles of merchandise 10 are transferred by the conveyance system 30 in direction A, parallel to the z direction vector, and through the detection/deactivation portal 100 along article passageway 110. Article passageway 110 designates the line of travel of the security tags 15 through portal 100. The detection/deactivation portal 100, in FIG. 1A, is formed between the four sides of antenna 122, and is where the article of merchandise 10 moves along passageway 110.

In some embodiments, a scanning station (not shown), including a scan gun, scan bed, or any other scan device, may be located further along in direction A, such that the articles 10 are conveyed to the scanning station after passing through the detection/deactivation portal 100. The scanning station may be located before the antenna 122 in the direction of B, such that the articles of merchandise 10 are conveyed to the detection/deactivation portal 100 after being scanned at the scanning station. The articles 10 are typically scanned for sale at the scanning station by reading a barcode, on a label attached or adhered to the article 10 or directly attached or adhered to the article 10, by use of laser(s) or an image capture system. In other embodiments, and as further described in reference to FIG. 5, an article of merchandise 10 may pass through the detection/deactivation portal 100 for detection and/or deactivation of the security tag 15 affixed to the article of merchandise 10, as it is scanned for purchase nearly simultaneous. This may be achieved where a scanner is located in proximity to the antenna(s), as for example antenna 122.

Referring again to FIG. 1A, during the process of check-out, whether self check-out or check-out by means of interaction with a store clerk, the article 10 is placed onto the conveyance system 30 and moved through the detection/deactivation portal 100, along article passageway 110, via the conveyor system 30 in direction A. The articles 10 are scanned for sale either prior to, during, or after detection and/or deactivation of the security tag 15.

As shown in FIG. 1A, the antenna 122 is coupled to a current generator 112 (sometimes known as a first current generator) by a pair of generator leads 113. The current generator 112 provides current driven through the pair of generator leads 113, from one lead through the antenna 122 to the other lead, to generate a detecting/deactivating electromagnetic (EM) field 150 emitted by the antenna 122. The electromagnetic field 150 may be pulse driven or continuously driven from the current generator 112 through antenna 122.

The antenna 122 may be a single and continuous antenna piece, as shown in FIG. 1A, or it may be constructed of multiple pieces. The antenna 122 may be copper. Alternatively, other conductive materials may be utilized to form the antenna 122, as known by one of ordinary skill in the art. Stiff and durable conductive material may alone form the antenna 122, as shown in FIG. 1A, so that the antenna 122 may stand vertically. In some embodiments, the antenna 122 may include one or more turns or loops. These turns or loops may wrap around other stable or stiff material that maintains the antenna 122 in a desired position above the counter top 22. In some embodiments, channels (not shown) may be formed, as for example by drilling, in the counter 20 so that portions of the antenna 122 may run through the channels so as to secure the antenna 122 into the counter 20 and to stand with support above the counter top 22. In other embodiments, other materials such as plastic or metal may be utilized to partially form the detection/deactivation portal 100, of which the antenna 122 may be connected to or located about. For example, the sides of the detection/deactivation portal 100 may be constructed with plastic tubes, wherein the antenna 122 runs through the tubes or loops around the outside of the tubes. Alternatively, for example, the antenna 122 may be copper tape applied to the inside or outside surface of the tubing. In other embodiments, flat pieces or walls may be used in alternative to tubes. In other embodiments, the detection/deactivation portal 100 may have only one or multiple sides. The portal 100 may be spherical. Alternatively, for example, the portal 100 may be other sizes or shapes, such as an octagon.

In the preferred embodiment, the current generator 112 is a high power generator. The generator leads 113 may, for example, be twisted pair of cable. The detecting/deactivating electromagnetic field 150 is generated and emitted by the antenna 122, in proximity to the detection/deactivation portal 100 due to the current flowing through the antenna 122. In other embodiments, the current generator 112 may be located remotely, further from the antenna 122 and/or counter 20, by using transmission lines and a matching circuit. The current generator 112 may provide lower power output to sense for the presence of a security tag 15 to thus detect the tag 15 by antenna 122. In alternative, or in addition to, the current generator 112 may supply higher power output to deactivate the security tag 15 by antenna 122. If a hard tag moves through the portal 100, the high power output from the current generator 112 may only cause the antenna 122 to sense the presence of the hard tag, but not deactivate the hard tag.

Figure 1B:
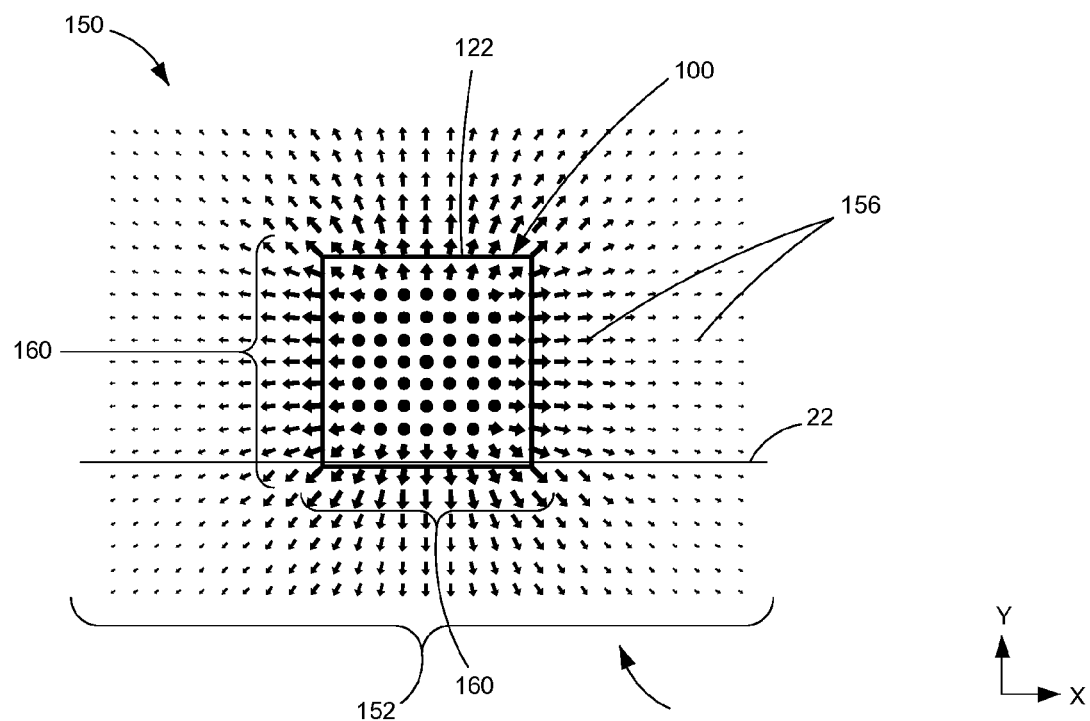
FIG. 1B illustrates the detecting/deactivating electromagnetic field from a front facing view of the portal of FIG. 1A.
Figure 1C:
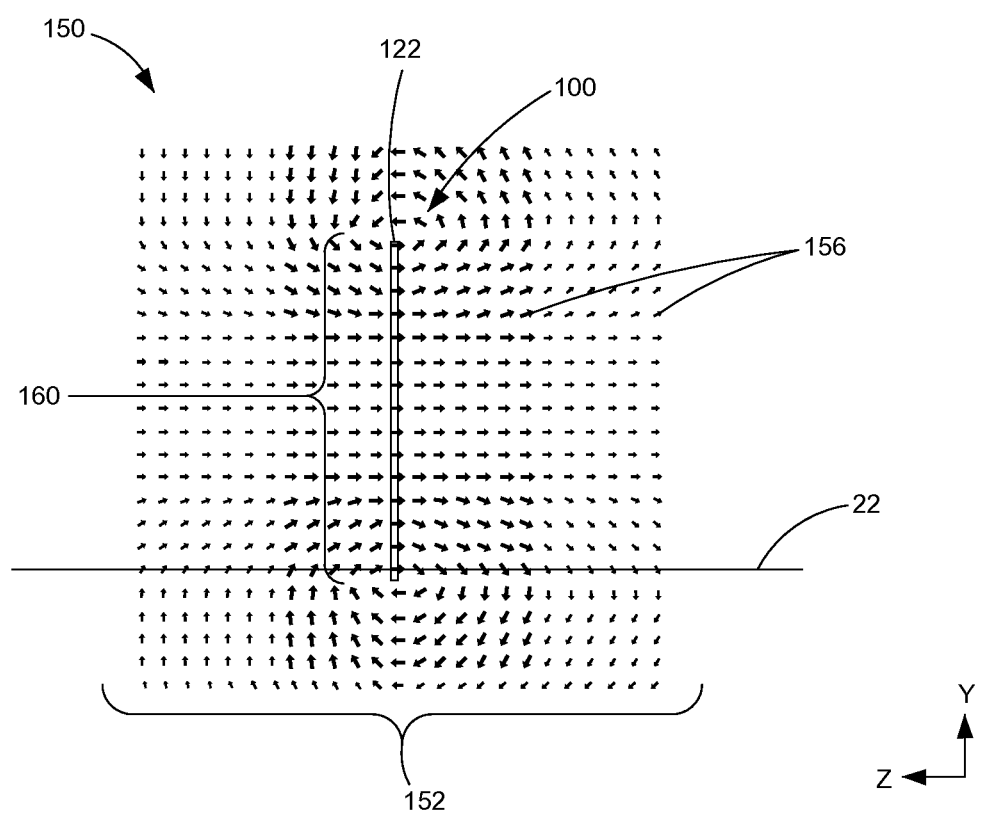
FIG. 1C illustrates the electromagnetic field of FIG. 1B from a side view of the portal of FIG. 1A.

FIG. 1B illustrates the electromagnetic field 150 from a front facing view of the portal 100 of FIG. 1A. The view of the detection/deactivation portal 100 of FIG. 1A is shown in the x-y plane from the z vector direction in FIG. 1B. Both FIGS. 1B and 1C show the resultant field pattern 152 of the electromagnetic field 150. FIG. 1C illustrates the electromagnetic field 150 of FIG. 1B from a side view of the detection/deactivation portal 100 of FIG. 1A. The one side of the antenna 122 is shown in the y-z plane from the x vector direction, along with its resultant field pattern 152. Flux lines 156 are shown in the resulting field pattern 152, wherein the electromagnetic field 150 of antenna 122 is used to detect and/or deactivate the security tag 15 about the detection/deactivation portal 100 as the security tag 15 passes through the portal 100. The field strength is illustrated by the thickness and shade of the flux lines 156, wherein the stronger resultant field pattern 152 is focused closer to the inside of the antenna 122 as shown by the darker, thicker flux lines 156. The lighter, thinner flux lines 156 demonstrate a weakening of the electromagnetic field 150 further away from the antenna 122. Hence, detection and/or deactivation are much more efficient within the antenna 122, being the detection/deactivation zone 160, as opposed to further away from the antenna 122. The strength of the near field transmission is limited to near and within the detection/deactivation portal 100, with dissipation of the transmission in the far-field further away from the portal 100.

By passing the article of merchandise 10 through the detection/deactivation portal 100 and hence proximate with the strongest portion of the electromagnetic field 150, at the detection/deactivation zone 160, a security tag 15 positioned at any orientation about an article 10 may be effectively detected and/or deactivated. Thus, security tags 15 oriented differently about each article of merchandise 10, as shown in FIG. 1A, may all be detected and/or deactivated. The detecting/deactivating electromagnetic field 150, is generated from about all four sides of antenna 122, as shown in FIG. 1A. In contradistinction, when an article 10 simply passes by or over a plane, wherein an antenna is located, only a portion of the article may be impacted by the electromagnetic field generated by that antenna. If, for example, a security tag 15 is located on the opposite side of the article 10 from the side facing the plane, and/or oriented differently so as not in parallel with the plane, then the security tag 15 may not be detected or deactivated. By passing through the detection/deactivation portal 100, and herein shown in FIG. 1A as being the plane bordered by the antenna 122, a security tag 15 positioned anywhere about an article of merchandise 10 and facing any direction will likely face at least some portion of the antenna 122, as for example a side of the antenna 122, as the article of merchandise 10 moves through the detection/deactivation portal 100. Thus, the security tag 15 may be detected and/or deactivated when confronted by the detecting/deactivating electromagnetic field 150 at least emitted partially by that portion of the antenna 122.

In other embodiments, the antenna 122 may be located further into the counter 20 than as shown in FIG. 1A, resulting in more of the sides of the antenna 122 being located in or below counter 20. In other embodiments, the antenna 122 may be angled differently in relation to the plane of the counter top 22 in the x-z plane, and thus not perpendicular as shown in FIG. 1A.

Referring to FIG. 1A, in some embodiments the conveyance system 30 may operate in both direction A and direction B. If for example, the store clerk or customer, in a self-checkout system, believes or may have been informed that the security tag 15 had been missed from detection and/or deactivation, then that operator may, for example, command the conveyance system 30 to reverse direction, in direction B, and then command the conveyance system 30 to move forward again, in direction A. The operator can simply press a button or flip a switch to cause the conveyance system 30, which may be connected with the controller 50, so that the article of merchandise 10 may pass through the detection/deactivation portal 100 a second or more times. The controller 50, alone or based upon operator input to the controller such as by button or switch, may provide the command to the conveyance system 30 to move in direction A or B, and/or turn on or off the conveyance system 30 to initialize or prevent movement of the conveyance system, and/or regulate the speed of the conveyance system 30.

In other embodiments, a direction detector 40 may be integrated with the conveyance system 30, as shown in FIG. 1A. The direction detector 40 may be coupled to the controller 50 and the conveyance system 30. The direction detector 40 may be coupled to a sensor 41, located in proximity to the conveyance system 30, to for example sense the movement of a spoke 34 on a conveyor wheel 32 that rotates in motion with the conveyor belt, that wraps around the counter top 22, and moves in direction A or B. The sensor 41 communicates with the direction detector 40 the sensed location of spoke 34 on wheel 32 at a given time so that the direction detector 40 may determine in which direction or the speed of which the conveyor belt is moving.

In some embodiments, the controller 50 may automatically modify the operation of the conveyance system 30 based on the determined travel direction and speed as communicated from the direction detector 40 to the controller 50. In other embodiments, the controller 50 may automatically modify the operation of the conveyance system 30 based on feedback from the antenna 122, in connection with the controller 50, as shown for example connection through current generator 112. If a security tag 15 is detected by the antenna 122, wherein the security tag 15 should have been deactivated by the same or a different antenna and was not deactivated, then the controller 50, after receiving the feedback from the antenna 122, may automatically reverse the conveyance system 30 in, for example, direction B and then may command the conveyance system 30 to move again in direction A to re-attempt deactivation. In some embodiments, controller 50 may command the conveyance system 30 in this manner to detect a security tag 15 when the first attempt to detect resulted in an undetected security tag 15. The controller 50 may modify the operation of the conveyance system 30 base on detection and/or deactivation of the tag 15. In other embodiments, based on the determined direction communicated by the direction detector 40, the controller 50 may command the current generator 112 to turn on the antenna 122, thus driving current through the antenna 122 when the conveyance system 30 is moving in one of the two directions. This may ensure that security tags 15 are only detected and/or deactivated when the operator or controller 50 operates the conveyance system 30 in the A or B direction, whichever direction is designated as the direction for detection and/or deactivation.

Indicator lights or sounds, such as a flashing LED or beep, may be provided in proximity to or by the controller 50 if the antenna 122 detects the security tag 15, to thus indicate to the operator at the point-of-sale station that the tag 15 was detected either before, simultaneously with, or after the tag 15 passes through the same or another antenna about the portal 100 for deactivation. This ensures that if antenna 122 senses the presence of the security tag 15, then it is likely that the same or another antenna, having attempted to deactivate the security tag 15 failed. Integration of a second antenna, wherein one antenna is used for detection and the other for deactivation is further described in other embodiments below.

In some embodiments, a conveyance system 30 may not exist. For example, the store clerk or customer may simply push or pull the article of merchandise 10 through the detection/deactivation portal 100. In these embodiments, the scanner may be embedded in the form of a window, in for example the counter top 22, at or near the detection/deactivation portal 100. In other embodiments, the counter 20 may be angled such that the article of merchandise 10 may simply slide down the counter top 22 and through the detection/deactivation portal 100. In other embodiments, the portal 100 may form a hole, as for example in the counter 20, wherein articles of merchandise 10 are simply dropped through the hole and deactivated as the articles of merchandise 10 fall through the hole. The bottom side of the hole may include a bag and bag discharge system such that the articles of merchandise 10 fall into a bag after the security tags 15 are deactivated while passing through the hole.

Figure 2A:
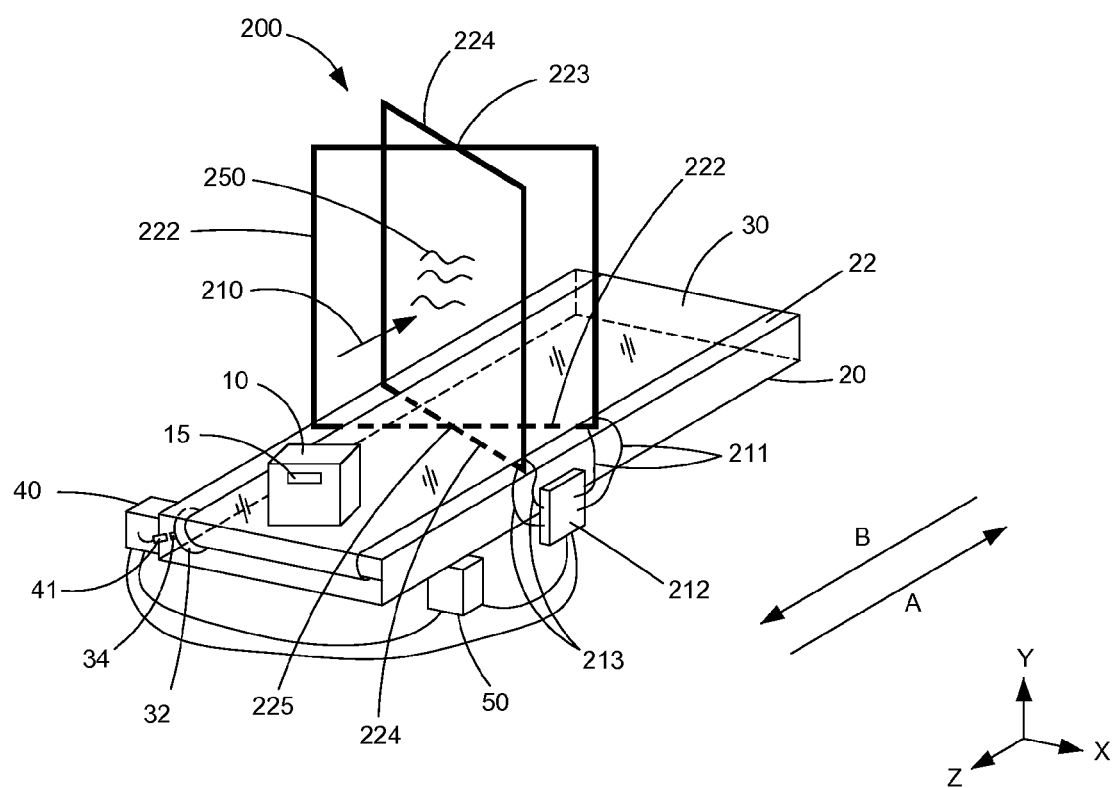
FIG. 2A illustrates a perspective view of a detection/deactivation portal which includes two antennas standing vertically and crossing one another above the counter top of FIG. 1A according to one embodiment.

FIG. 2A illustrates a perspective view of detection/deactivation portal 200 which includes two antennas 222, 224 (sometimes known as a first antenna and a second antenna, respectively) standing vertically and crossing one another above the counter top 22 of FIG. 1A. Planes of each antenna 222, 224, formed and bordered by the four sides of each antenna 222, 224 and of which the security tags 15 pass through, intersect each other at the upper antenna cross point 223 and lower antenna cross point 225, as shown in FIG. 2A. The first antenna 222 and second antenna 224 together form the detection/deactivation portal 200. The angles of the planes for the first antenna 222 and second antenna 224 are arranged respective to one another so as to still allow for an article of merchandise 10 to move through both antennas 222, 224 along article passageway 210 through the detection/deactivation portal 200, on conveyance system 30. For some embodiments, the angle of the plane of the first antenna 222 is orthogonal to the plane of the second antenna 224. In other embodiments, the angle may not be orthogonal. As shown in FIG. 2A, the current generator 212 supplies current through a first set of generator leads 211 to the first antenna 222 and through a second set of generator leads 213 to the second antenna 224. The current may be supplied continuously or pulsed to each antenna 222, 224. In other embodiments, one current generator (sometimes known as a first current generator) may supply current to one antenna and another current generator (sometimes known as a second current generator) may supply current to another antenna.

Figure 2B:
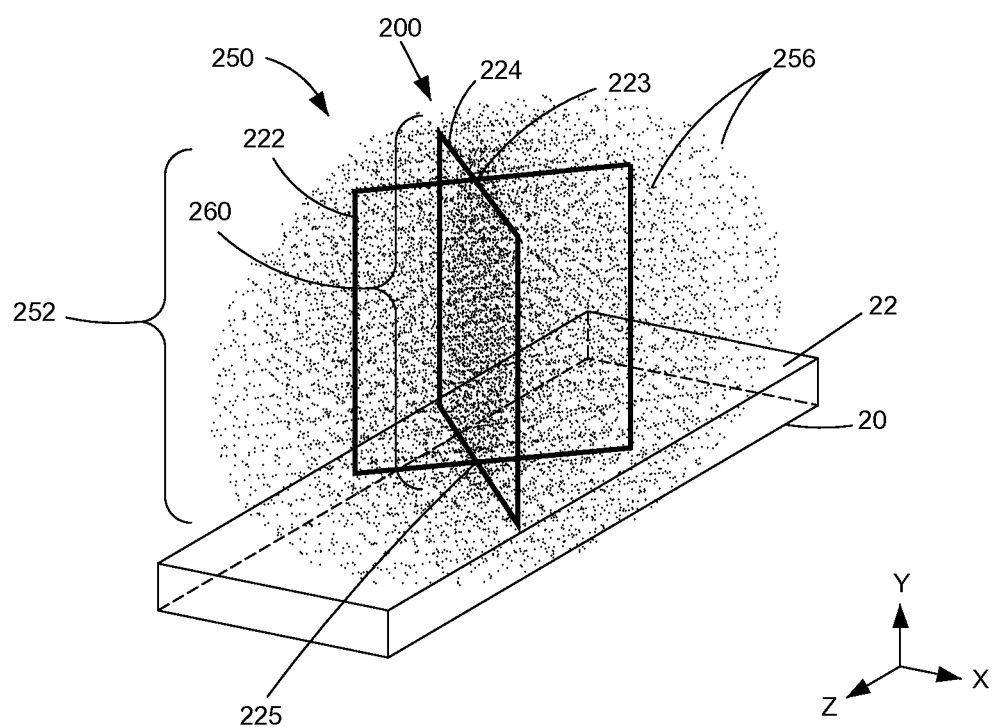
FIG. 2B illustrates a perspective view of the detecting/deactivating electromagnetic field at the detection/deactivation portal of FIG. 2A.

FIG. 2B illustrates a perspective view of the detecting/deactivating electromagnetic field 250 at the detection/deactivation portal 200 of FIG. 2A. Based on the representation of flux lines 256 shown in the resulting field pattern 252, the strength of the electromagnetic field 250 is located approximately at the center of the detection/deactivation portal 200 in a volume running vertically between the upper antenna cross point 223 and lower antenna cross point 225 and mostly confined inside the sides of the first antenna 222 and second antenna 224, designated as the detection/deactivation zone 260. The strongest portion of the electromagnetic field 250 is approximately located about the upper antenna cross point 223 and lower antenna cross point 225.

The addition of one or more antennas to the existing single antenna of FIG. 1A increases the likelihood that for a certain security tag 15 at an odd orientation, or in some manipulated form (i.e. bent or wrinkled), it may be detected and/or deactivated by an electromagnetic field generated from the combined eight sides of two antennas, as shown in FIG. 2A, as opposed to four sides from one antenna, as shown in FIG. 1A.

Figure 3A:
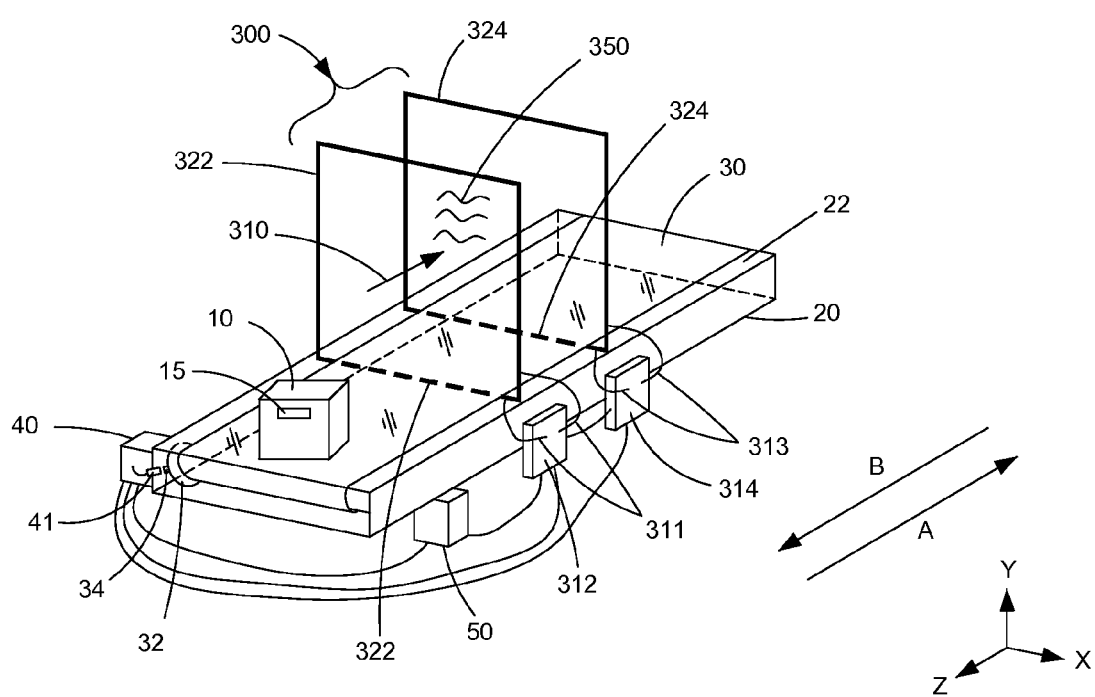
FIG. 3A illustrates a perspective view of a detection/deactivation portal which includes an additional antenna positioned in parallel with the antenna of FIG. 1A according to one embodiment.

FIG. 3A illustrates a perspective view of a detection/deactivation portal 300 which includes an additional antenna positioned in parallel with the antenna of FIG. 1A. The first antenna 322 is shown in connection with a first set of generator leads 311 connected to a first current generator 312. The second antenna 324 is shown in connection with a second set of generator leads 313 connected to a second current generator 314. In other embodiments, the first antenna 322 and second antenna 324 may be connected by generator leads to a single current generator, as for example shown in FIG. 2A.

As shown in FIG. 3A, the first antenna 322 and second antenna 324 are positioned in parallel, such that an article of merchandise 10 passes through the planes bordered by each antenna 322, 324 along article passageway 310, wherein both antennas 322, 324 together form the detection/deactivation portal 300. The addition of a second antenna 324, behind and in parallel to the first antenna 322, may be used for redundancy so that if a security tag 15 is not detected and/or deactivated when passing through the first antenna 322, as for example if when the first antenna 322 may be defective, then the security tag 15 may be detected and/or deactivated when it passes through the second antenna 324. In other embodiments, more than one additional antenna may be utilized, such that, for example, three or more antennas may stand in parallel along counter 20.

For the two parallel antennas 322, 324 shown in FIG. 3A, the two parallel antennas 322, 324 may be driven out-of-phase from one another so as to achieve far-field cancellation of the electromagnetic field 350. The electromagnetic field 350 generated by antennas 322, 324, positioned in parallel, as shown in FIG. 3A, and driven out-of-phase, can cancel in the far field by as much as 17 dB when compared to a single antenna, as shown in FIG. 1A.

Figure 3B:
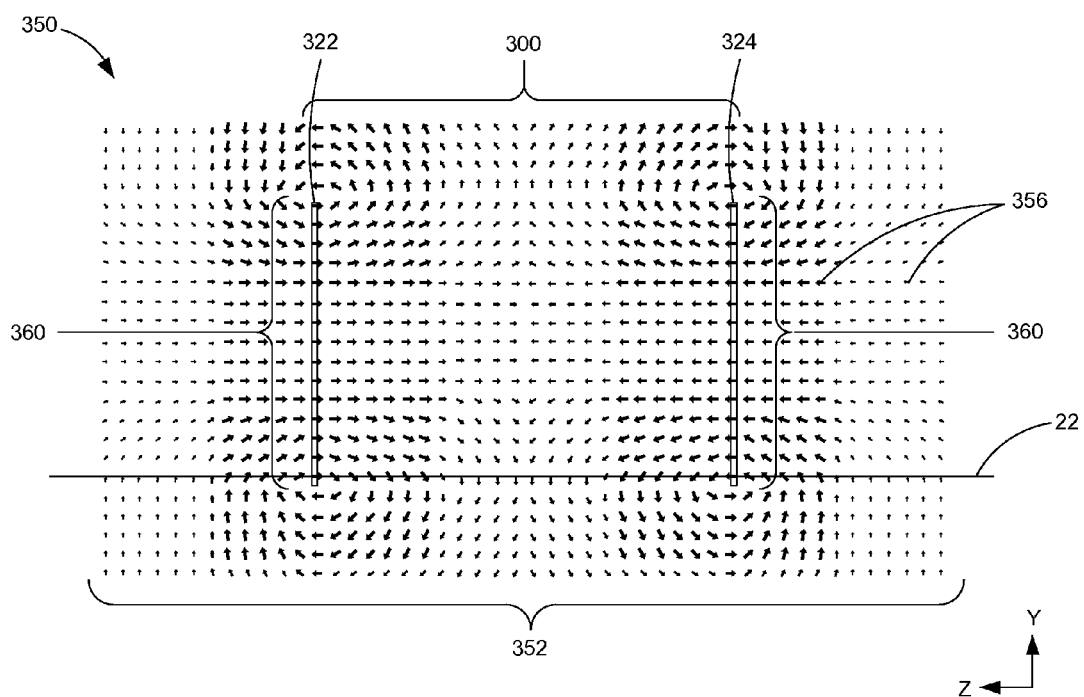
FIG. 3B illustrates a side view of the detecting/deactivating electromagnetic field at the portal of FIG. 3A.

FIG. 3B illustrates a side view of the detecting/deactivating electromagnetic field 350 at the detection/deactivation portal 300 of FIG. 3A. Based on the representation of flux lines 356 shown in the resulting field pattern 352, the strength of the electromagnetic field 350 is positioned at and around each antenna 322, 324, such that the detection/deactivation zone 360 is between each of the antennas 322, 324, wherein each antenna as shown in FIG. 3A may be considered the entrance and/or exit of the detection/deactivation portal 300. As shown in FIG. 3B, the flux lines 356 are lighter further away from the detection/deactivation portal 300. The detecting/deactivating electromagnetic field 350 weakens for improved cancellation in the far field when the two antennas 322, 324 are driven out-of-phase from one another.

In other embodiments, the antennas 322, 324 may not be located exactly in parallel. In other embodiments, one antenna may be different in size and/or shape from the other antenna. In other embodiments, one antenna may be driven in-phase or out-of-phase from the other antenna.

In other embodiments, one or both of the antennas may be used solely for detection, to sense the presence of a security tag 15. For example, in FIG. 3A, the first antenna 322 may be a detection antenna to detect an active security tag 15. If the first antenna 322 detects the active security tag 15 on the article of merchandise 10, a message may be relayed to the operator or controller 50 that the security tag 15 has been detected by first antenna 322. The operator may then be assured that the security tag 15 will likely be deactivated by the second antenna 324 based on the orientation of the security tag 15 since the security tag 15 was detected by an antenna in similar position arrangement, being the first antenna 322. In other embodiments, the second antenna 324 may be a detection antenna so that if any security tag 15 was not deactivated by the first antenna 322, then the second antenna 324 may detect the security tag 15 and inform the operator or controller 50 that tag 15 was not deactivated by first antenna 322. The operator or controller 50 may then reverse the conveyance system 30 in direction B and then forward the conveyance system 30 in direction A to move article 10 with the still active security tag 15 back through first antenna 322 for another attempt to the tag 15. In some embodiments, the first antenna 322 and/or second antenna 324 may be angled differently than the other antenna in relation to the counter top 22. This may ensure that the differently angled antenna detects and/or deactivates security tag 15 if the other antenna could not. In other embodiments, as for example with three vertical standing antennas all in parallel, the inside antenna may be for detection or deactivation, and the outside antennas may be for deactivation if the inside antenna is for detection, or for detection if the inside antenna is for deactivation. This may be utilized as a second opportunity to deactivate or detect the security tag 15 moving along conveyance system 30.

In other embodiments, either or all antennas may be used for both detection and/or deactivation. For example, current supply from a current generator may be pulsed at high or low power at various cycle stages. Thus, one antenna may pulse to sense for the security tag 15 to detect and at a subsequent time then pulse to deactivate the security tag 15 from the same antenna. The controller 50 and/or current generator may determine when a high power deactivating pulse should be initiated by the current generator based on whether a security tag 15 was detected. Alternatively, the deactivation pulse may be automatically initiated at certain stages in a cycle. For example, after two pulses of detection, the antenna may automatically pulse for deactivation. The cycle time may be adjusted by the controller 50 of which receives speed and/or direction information of the conveyance system 30 from the direction detector 40, wherein the direction detector 40 may determine the speed and/or direction of travel of the conveyance system 30 from a spoke 34 on a wheel 32 integrated with the conveyor belt as sensed by sensor 41.

Figure 4A:
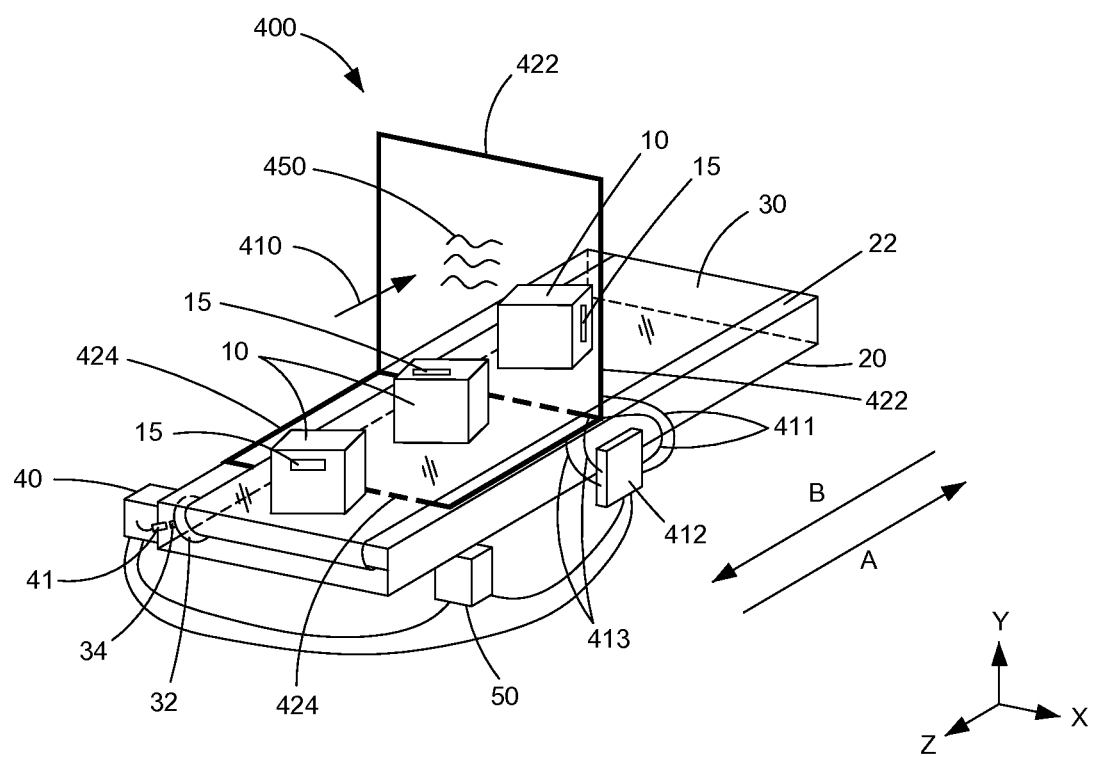
FIG. 4A illustrates a perspective view of a detection/deactivation portal which includes the vertical standing antenna of FIG. 1A perpendicular to a horizontal antenna according to one embodiment.

FIG. 4A illustrates a perspective view of a detection/deactivation portal 400 which includes the vertical standing antenna of FIG. 1A perpendicular to a horizontal antenna. As shown in FIG. 4A, the first antenna 422 is standing vertical and perpendicular to counter top 22, as shown in FIG. 1A. The first antenna 422 is also perpendicular to a second antenna 424, which is embedded into counter top 22 of counter 20 and is located under conveyance system 30, in parallel to the x-z plane. In some embodiments, the second antenna 424 may be located on the top surface of the counter top 22, within the counter top 22, or below the counter top 22. The first antenna 422 is shown in connection with a first set of generator leads 411 connected to a current generator 412 and the second antenna 424 is shown in connection with a second set of generator leads 413 connected to the same current generator 412. In other embodiments, the antennas 422, 424 may each be connected to different current generators.

As shown in FIG. 4A, first antenna 422 and second antenna 424 are perpendicular to one another, such that an article 10 first passes over the horizontally positioned second antenna 424 and then along article passageway 410 through the first antenna 422, and thus the plane bordered by the first antenna 422 forming the detection/deactivation portal 400. Detection and/or deactivation of security tag 15 is increased as the article of merchandise 10 passes both over and through antennas 422, 424.

Figure 4B:
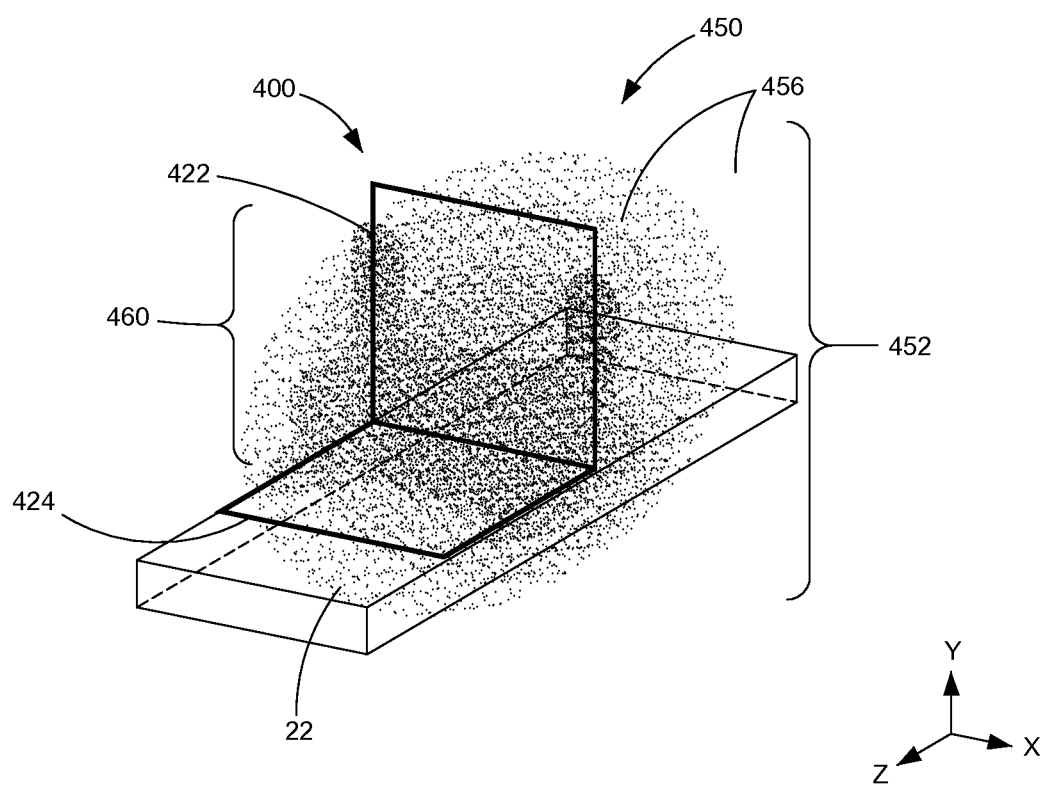
FIG. 4B illustrates a perspective view of the detecting/deactivating electromagnetic field at the portal of FIG. 4A.

FIG. 4B illustrates a perspective view of the detecting/deactivating electromagnetic field 450 formed by the first antenna 422 and second antenna 424 at portal 400 of FIG. 4A. Based on the representation of flux lines 456, shown in the resulting field pattern 452, the electromagnetic field 450 is strongest where the sides of each of the antennas 422, 424 are adjoined. The strong field pattern 452, in the vicinity of the adjoined sides of the first antenna 422 and second antenna 424, is the detection/deactivation zone 460. In some embodiments, the first antenna 422 and second antenna 424 may share a common side. In other embodiments, the first antenna 422 may be slightly removed from the second antenna 424, so that the two antennas 422, 424 do not have a side in contact. As shown in FIG. 4B, the flux lines 456 are lighter further away from the two antennas 422, 424.

As shown in both FIGS. 4A and 4B, the detection/deactivation portal 400 is defined by the plane bordered by the first antenna 422. The first antenna 422 provides a strong portion of the electromagnetic field 450 in the x vector direction in both the A and B directions. The second antenna 424 provides a strong portion of the electromagnetic field 450 in the y vector direction. Both the first antenna 422 and second antenna 424 provide electromagnetic field components in the z vector direction. Thus, the first antenna 422 and second antenna 424 are configured so at to create a three dimensional detecting/deactivating electromagnetic field 450 about the detection/deactivation portal 400. The horizontal and vertical antenna configurations, as shown in FIG. 4A, focuses the detecting/deactivating electromagnetic field 450 to within and about antennas 422, 424 while dissipation of the electromagnetic field 450 occurs further from antennas 422, 424. Since articles of merchandise 10 go through the vertical loop, that being first antenna 422, the horizontal-vertical antenna configuration provides efficient deactivation at a relatively low power level. The currents from the current generator(s) 412 may be tuned for flow through antennas 422, 424 to provide for optimal detection and/or deactivation performance within regulatory emissions limits.

In other embodiments, one antenna may be different in size and/or shape from the other antenna. In other embodiments, one antenna may be driven in-phase or out-of-phase from the other antenna. In other embodiments, the first antenna 422 and second antenna 424 may be positioned so that the article of merchandise 10 first passes through the vertical standing first antenna 422 and then passes over the horizontal second antenna 424. In other embodiments, a horizontal antenna may be positioned on each side of the vertical standing antenna, and thus before and after the vertical standing antenna along conveyance system 30 on counter top 22. In other embodiments, a vertical standing antenna may be positioned before and after a horizontal antenna on counter top 22. In other embodiments, at least a portion of the horizontal antenna may be located within the vertically standing antenna or vice versa. In other embodiments, the horizontally positioned antenna may be designated just for detection and the vertical standing antenna designated just for deactivation or vice versa. Any number of configurations of two or more antennas, whether each antenna is for deactivation and/or detection, may be positioned at any angle from the other along counter top 22.

Figure 5:
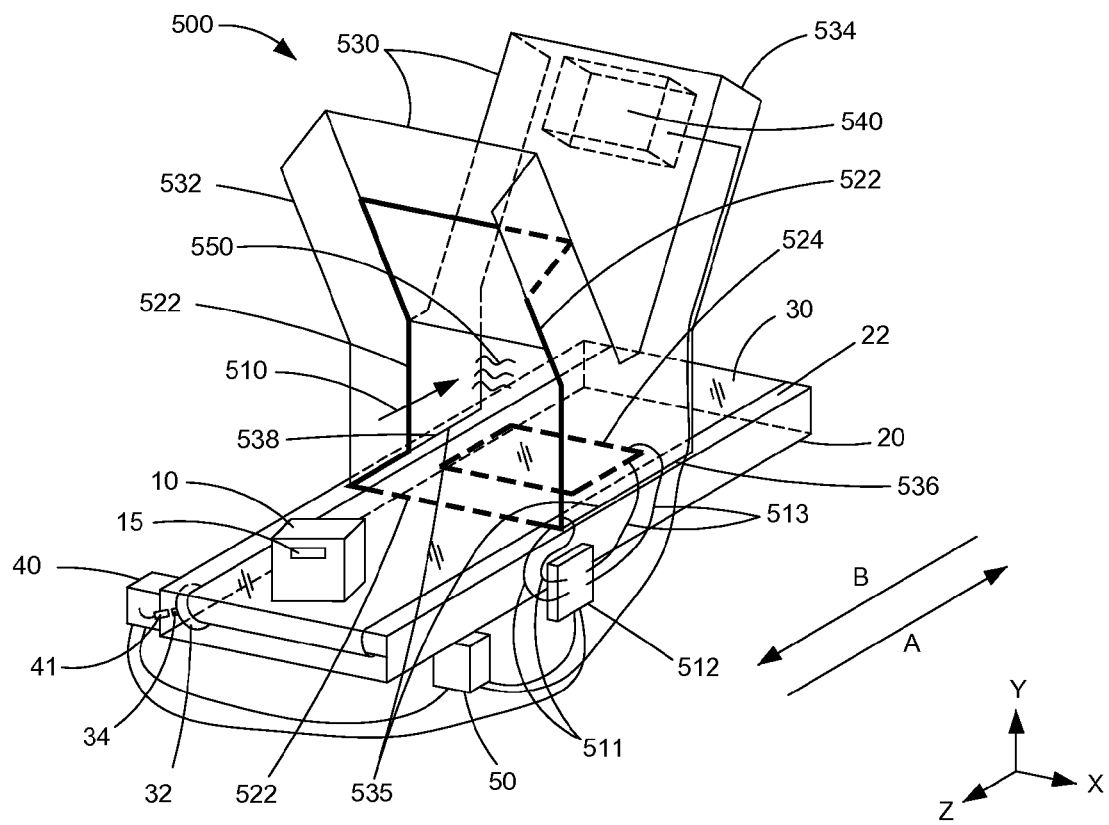
FIG. 5 illustrates a perspective view of a detection/deactivation portal in an antenna/scanner housing according to one embodiment.

FIG. 5 illustrates a perspective view of a detection/deactivation portal 500 in an antenna/scanner housing 530. As shown in FIG. 5, the antenna/scanner housing 530 is positioned to stand vertically extending up from the surface of counter top 22. The antenna/scanner housing 530 is mounted to counter top 22 at the first edge 536 and second edge 538 of housing base 535. The housing 530 may be mounted by glue, screw, or any other means so as to attach the housing 530 to the counter top 22. The antenna/scanner housing 530 is shown as transparent to allow for view of first antenna 522, second antenna 524, and scanner 540. The antenna/scanner housing 530 may be a solid color or any other patterns of colors so as to conceal first antenna 522 integrated within. The antenna/scanner housing 530 is positioned over the conveyance system 30 and forms over and around an article passageway 510 such that articles of merchandise 10 of various sizes may move along conveyance system 30 and through the antenna/scanner housing 530.

The antenna/scanner housing 530 may be constructed of one or more various materials. The materials may include plastic, cardboard, Styrofoam, fiberglass, wood, or any other material or combination of materials of which the antenna may be attached to or placed within. The antenna/scanner housing 530 may be constructed of material so as to shield the detection/deactivation electromagnetic field 550 from penetrating through the antenna/scanner housing 530.

The first antenna 522 is integrated within the antenna/scanner housing 530 and is shown as running along the second edge 538 of the housing base 535, crossing under conveyance system 30 and up through first housing pillar 532. A second antenna 524, a horizontal loop antenna, is positioned under conveyance system 30 and between the first edge 536 and second edge 538 of housing base 535. The first antenna 522 defines the detection/deactivation portal 500 of which an article 10 passes through. In other embodiments, a horizontal antenna may or may not exist. A scanner 540 for detecting barcodes, on labels or directly on merchandise, including laser(s) or an image capture system, may be located within second housing pillar 534. The first antenna 522 may be connected to current generator 512 by generator leads 511 and second antenna 524 may be connected to the same current generator 512 by generator leads 513. In other embodiments, each antenna 522, 524 may be connected to separate current generators.

During check out, articles of merchandise 10 may be placed onto conveyance system 30 on counter top 22 of counter 20 where they are moved via the conveyance system 30 in direction A. The security tag 15 is detected and/or deactivated as the article of merchandise 10 passes through first antenna 522, in the detection/deactivation portal 500 along article passageway 510, and as the article of merchandise 10 passes over second antenna 524. Currents driven through and emitted by both first antenna 522 and second antenna 524 form the detecting/deactivating electromagnetic field 550 about portal 500. At about the same time of detection and/or deactivation, the bar code is scanned by scanner 540 positioned in the second housing pillar 534.

In other embodiments, either the first antenna 522 or second antenna 524 may alternatively be for only detection and the other antenna only for deactivation. In other embodiments, another antenna may be embedded into the second housing pillar 534. In other embodiments, scanner 540 may be located in the first housing pillar 532 instead of the second housing pillar 534. In other embodiments, another scanner may be located in the first housing pillar 532 in addition to the scanner 540 located in the second housing pillar 534. In other embodiments, the conveyance system 30 may not exist. In these embodiments, the scanner may be located in the counter top 22, in addition to or in alternative of a scanner located in either or both housing pillars 532, 534.

Figure 6:
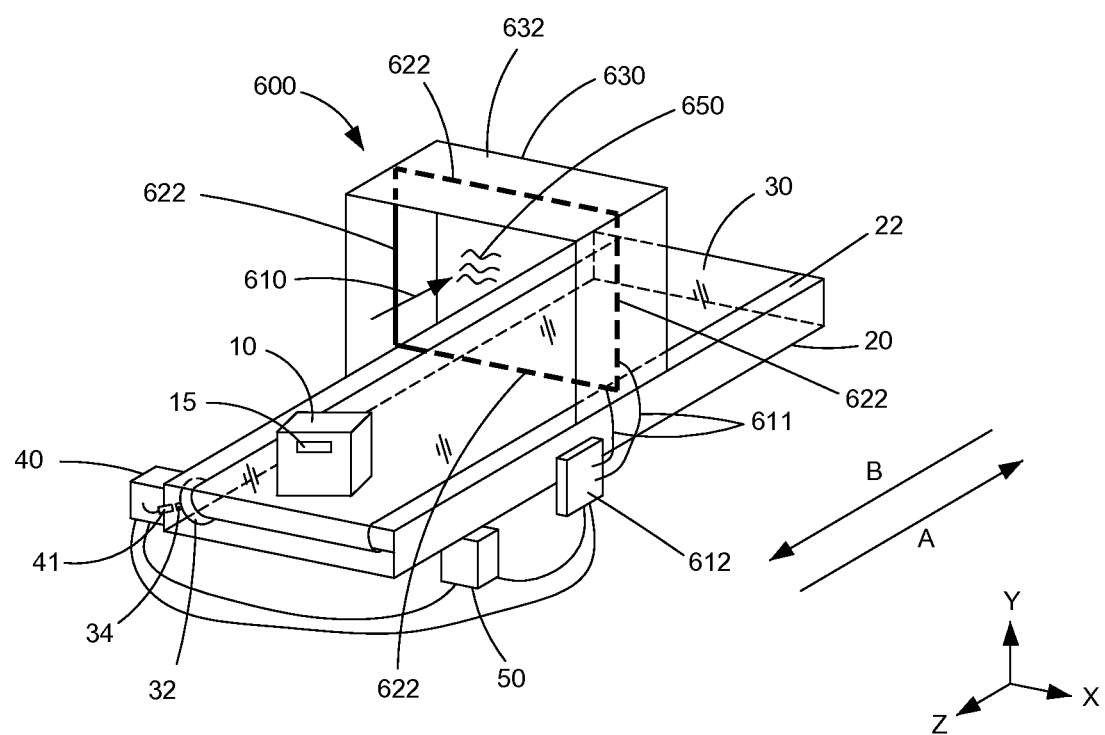
FIG. 6 illustrates a perspective view of a detection/deactivation portal wherein the antenna of FIG. 1A is positioned within an antenna housing according to one embodiment.

FIG. 6 illustrates a perspective view of a detection/deactivation portal 600 wherein the antenna of FIG. 1A is positioned within an antenna housing 630. An article 10 travels on the conveyance system 30, along article passageway 610, through portal 600 located about article housing 630. A detecting/deactivating electromagnetic field 650 is formed about portal 600 by antenna 622 to detect and/or deactivate security tag 15. Current is driven through the antenna 622 from current generator 612 by a pair of connected generator leads 611. Again, the counter 20 and conveyance system 22 is shown as transparent so as to view the bottom side of the antenna 622 running below the conveyance system 30. The antenna housing 630 is shown as transparent, such that all four sides of the antenna 622 are shown with three of the sides located on the inside surface of the antenna housing 630. The antenna housing 630 may be of any size or shape. As shown in FIG. 6, the housing 630 is mounted to the top surface of counter top 22. In other embodiments, the housing 630 may be mounted to the sides or beneath the counter 20 and/or to the floor (not shown). In the embodiment shown in FIG. 6, antenna 622 is made of copper tape that is adhered to the internal sides of the antenna housing 630. In other embodiments, antenna 622 may run along the outside sides of antenna housing 630 or internally within the walls of antenna housing 630. The antenna housing 630 may be constructed of one or more various materials. The materials may include plastic, cardboard, Styrofoam, fiberglass, wood, or any other material or combination of materials of which antenna 622 may be attached to or placed within. The antenna housing 630 may be constructed of material so as shield at least a portion of the detection/deactivation electromagnetic field 650, formed about portal 600, from penetrating through antenna housing 630.

In other embodiments, more than one antenna may be positioned within the antenna housing 630, such as for example the parallel antennas shown in FIG. 3A. Horizontal antennas may also be included under the conveyance system 630, underneath or in proximity to antenna housing 630. In other embodiments, a horizontal antenna may be positioned in or on the housing roof 632 of antenna housing 630. The horizontal antenna in or on the housing roof 632 may be located in an x-z plane parallel to the counter top 22 and having an electromagnetic field component in the y direction.

Figure 7:
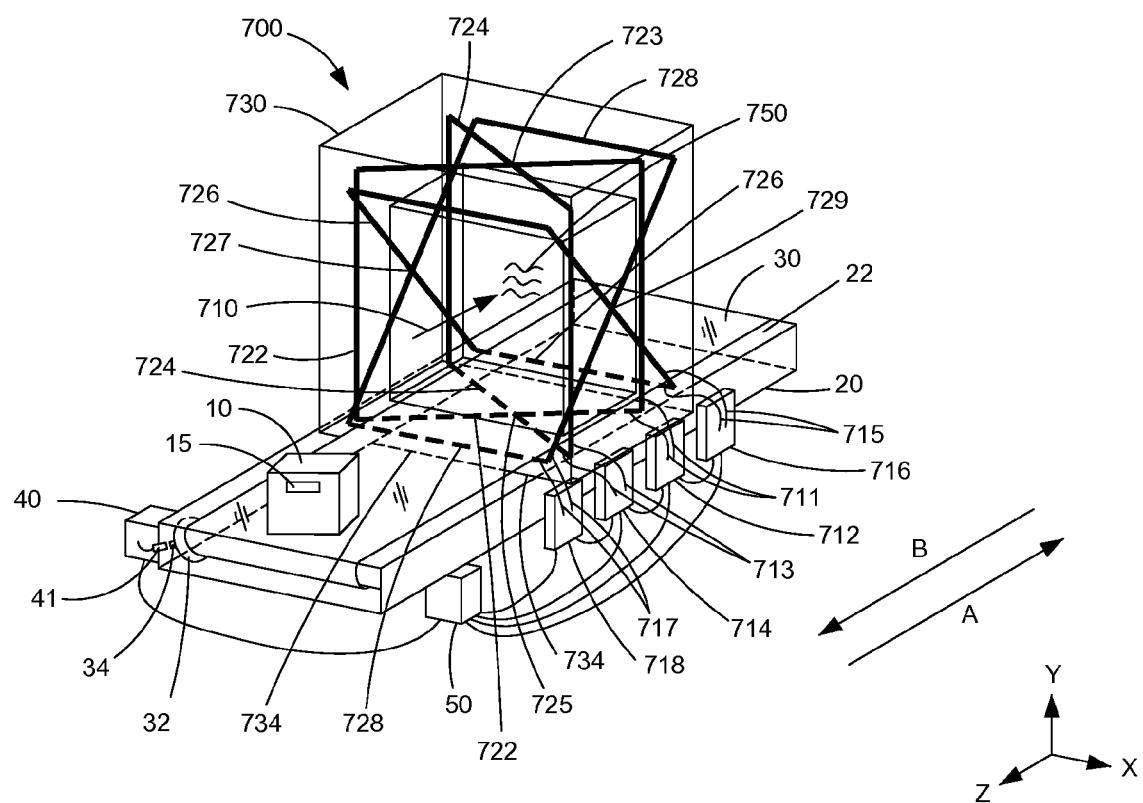
FIG. 7 illustrates a perspective view of an antenna housing supporting four antennas according to one embodiment.

FIG. 7 illustrates a perspective view of an antenna housing 730 supporting four antennas 722, 724, 726, 728. The antenna housing 730 is located above counter top 22. All four antennas 722, 724, 726, 728 are positioned within the antenna housing 730, as they are positioned over counter top 22 as shown in FIG. 7. As shown in FIG. 7, the housing floor 734 may be located above counter top 22 but lay underneath conveyance system 30. In other embodiments, the housing floor 734 may be located below counter top 22. An article of merchandise passageway 710 is located through the planes bordered by sides of each of the four deactivation antennas 722, 724, 726, 728, in the antenna housing 730, so that an article of merchandise 10 may pass along article passageway 710 on conveyance system 30 as through the detecting/deactivating portal 700. As shown in FIG. 7, the four antennas 722, 724, 726, 728 are arranged such that a security tag 15 may pass through the planes bordered by each antenna of all four antennas 722, 724, 726, 728, at nearly the same time. In other embodiments, the antennas 722, 724, 726, 728 may be separated by a distance so that the security tag 15 does not pass through the antennas 722, 724, 726, 728 at the same time.

The first antenna 722 and second antenna 724 cross one another at the upper antenna cross point 723 and lower antenna cross point 725. Additionally, the third antenna 726 and fourth antenna 728 are positioned in the antenna housing 730, wherein the third antenna 726 and fourth antenna 728 intersect at the first side antenna cross point 727 and second side antenna cross point 729. As shown in FIG. 7, the first antenna 722 and second antenna 724 are orthogonal to one another as the plane of each antenna crosses each plane's midpoint. The third antenna 726 and fourth antenna 728 are orthogonal to one another as the plane of each antenna crosses each plane's midpoint. In other embodiments, the intersection of the antennas 722, 724, 726, 728 may occur at any angle to one another so as long as article 10 may pass through the plane of each antenna. The detection/deactivation portal 700 is defined within the antenna housing 730 by the combination and intersection of the two sets of antennas, being the set of first antenna 722 and second antenna 724 and the set of third antenna 726 and fourth antenna 728. Four antennas may be used in this combination, as shown in FIG. 7, to achieve bulk detection and/or deactivation of security tags 15 at various orientations. In other embodiments, any one or more of the four antennas 722, 724, 726, 728 may be solely for detection and the other antennas for deactivation, or vice versa. Another antenna may be added elsewhere outside or inside antenna housing 730.

The antenna housing 730 may include plastic, cardboard, Styrofoam, fiberglass, wood, or any other material of which the antennas 722, 724, 726, 728 may be attached to or positioned within. The antenna housing 730 may also be configured with metal, as for example on the exterior of the antenna housing 730. The metal may be used to shield the detecting/deactivating electromagnetic field 750 so as to confine the detecting/deactivating electromagnetic field 750 to within the antenna housing 730. Ferrites may or may not be positioned within the antenna housing 730 for shielding purposes. As shown in FIG. 7, first current generator 712 supplies current to the first antenna 722 through first pair of generator leads 711. Second current generator 714 supplies current to the second antenna 724 through second pair of generator leads 713. Third current generator 716 supplies current to the third antenna 726 through third pair of generator leads 715. Fourth current generator 718 supplies current to the fourth antenna 728 through fourth pair of generator leads 717. In other embodiments, antennas 722, 724, 726, 728 may share connection with one or more current generators.

Figure 8:
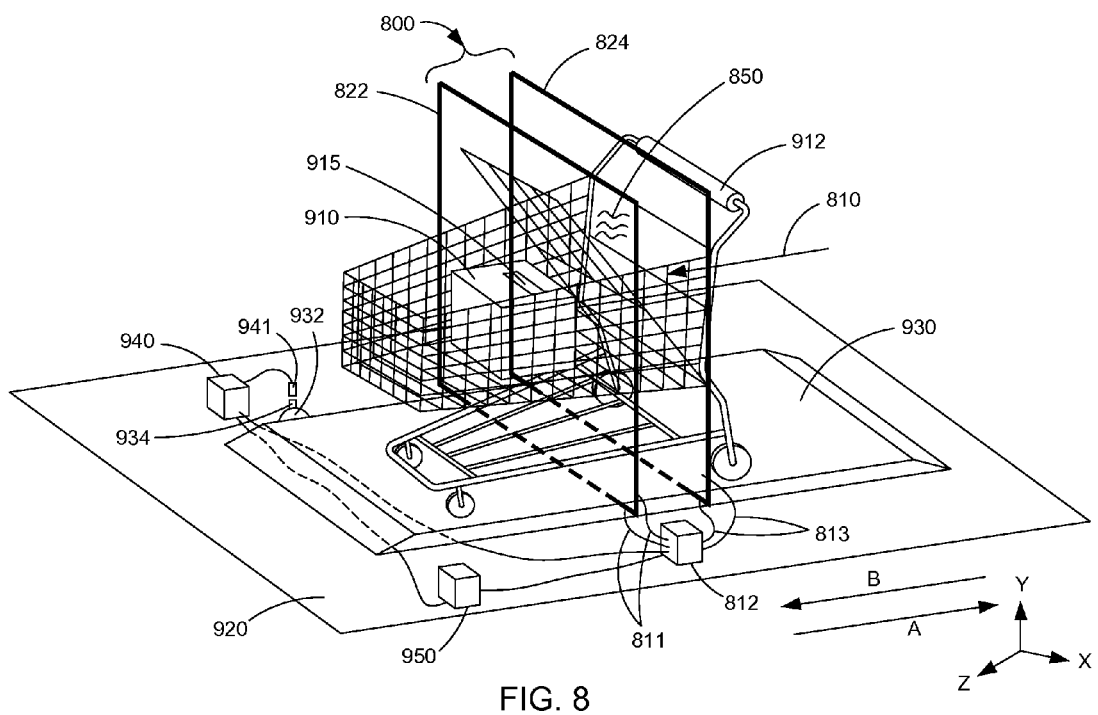
FIG. 8 illustrates a perspective view of a detection/deactivation portal including two parallel antennas positioned vertically over a conveyance system for shopping carts.

FIG. 8 illustrates a perspective view of a detection/deactivation portal 800 which includes two parallel antennas 822, 824 positioned vertically over a conveyance system 930 for shopping carts 912. A first antenna 822 and second antenna 824 form a detection/deactivation portal 800, wherein each antenna 822, 824 is large enough so that a shopping cart 912, containing articles of merchandise 910, having one or more security tags 915 located on the article 910, may pass through the planes bordered by sides of each antenna 822, 824 forming the detection/deactivation portal 800 along cart passageway 810. The detecting/deactivating electromagnetic field 850 is formed about portal 800 by first antenna 822 and second antenna 824. The shopping cart 912 may move along a conveyance system 930. The conveyance system 930 is shown as transparent so as to view the bottom side of the two antennas 822, 824. The bottom side of the two antennas 822, 824 may be embedded within or positioned on top of the floor 930 underneath the conveyance system 930. To detect and/or deactivate a security tag 915 about an article of merchandise 910 in a shopping cart 912, additional vertical and/or horizontal antennas may be used. The first antenna 822 and second antenna 824, shown in FIG. 8, may be positioned at any angle relative to one another and/or to the floor 920, so long as the shopping cart 912 may pass through at least one of the antennas. As shown, first antenna 822 and second antenna 824 are connected to current generator 812 by two sets of generator leads 811, 813. Current generator 812, controller 950, and direction detector 940 may be located above or underneath the surface of the floor 920. Sensor 941, coupled to direction detector 940, may be located in proximity to the conveyance system 930 to sense motion of spoke 934 on conveyance wheel 932, which moves relative to conveyance system 930 over the floor. The sensor 941 may also sense speed and/or direction of the shopping cart 912 and then communicate to the direction detector 940 to determine the speed and/or direction of shopping cart 912. Antenna configurations of FIGS. 1A, 2A, 4A, 6, and 7 may also be used in alternative, with the antennas enlarged to allow for shopping carts 912 to pass through. In other embodiments, any of antennas 822, 824, whether vertical or horizontal, may be used solely for detection or deactivation. The first antenna 822 and second antenna 824 shown in FIG. 8 may be driven in-phases or out-of-phase, as described in reference to FIG. 3A.

In other embodiments, conveyance system 930 may not exist such that shopping carts 912 may be rolled through antenna(s) 822, 824 by a store employer or customer. In some embodiments, antenna(s) 822, 824 may serve for security tags 915 left in or about the cart 912 at a station where the customer leaves the shopping cart 912 following purchase at the store. A store employee may then be informed, by for example controller 50, if a security tag 915 is detected in shopping cart 912 so that the employee can remove the security tag 915 to eliminate tag pollution. Tag pollution can occur when a subsequent customer retrieves cart 912 and alarms detection antennas, such as at the point of egress, when tag 915 is active and left in cart 912.

In other embodiments, as for example in a warehouse, shopping cart 912 may be replaced by a pallet which could be transported through antennas 822, 824 by a conveyance system or by forklift.

Numerous configurations of antennas, each for detection and/or deactivation, may be used in the embodiments described above. In other embodiments, and for any of the above-described configurations, the conveyance system may not exist so that an article of merchandise is manually moved through the detection/deactivation portal. In these embodiments, a scanning window may be integrated into the counter top 22 or floor 920, so that barcodes may be scanned on the article of merchandise before, during, or after detection and/or deactivation of the security tag. In other embodiments, an antenna may be integrated with any sidewall extending above the counter top 22, which may or may not be approximately perpendicular to the counter top 22, such that merchandise moving along the counter 20, such as on the conveyance system 30, passes by the sidewall and over that particular antenna integrated with the sidewall. In other embodiments, the antennas may be bent or configured so as to border around more than one plane to form the detection/deactivation portal.

Figure 9:
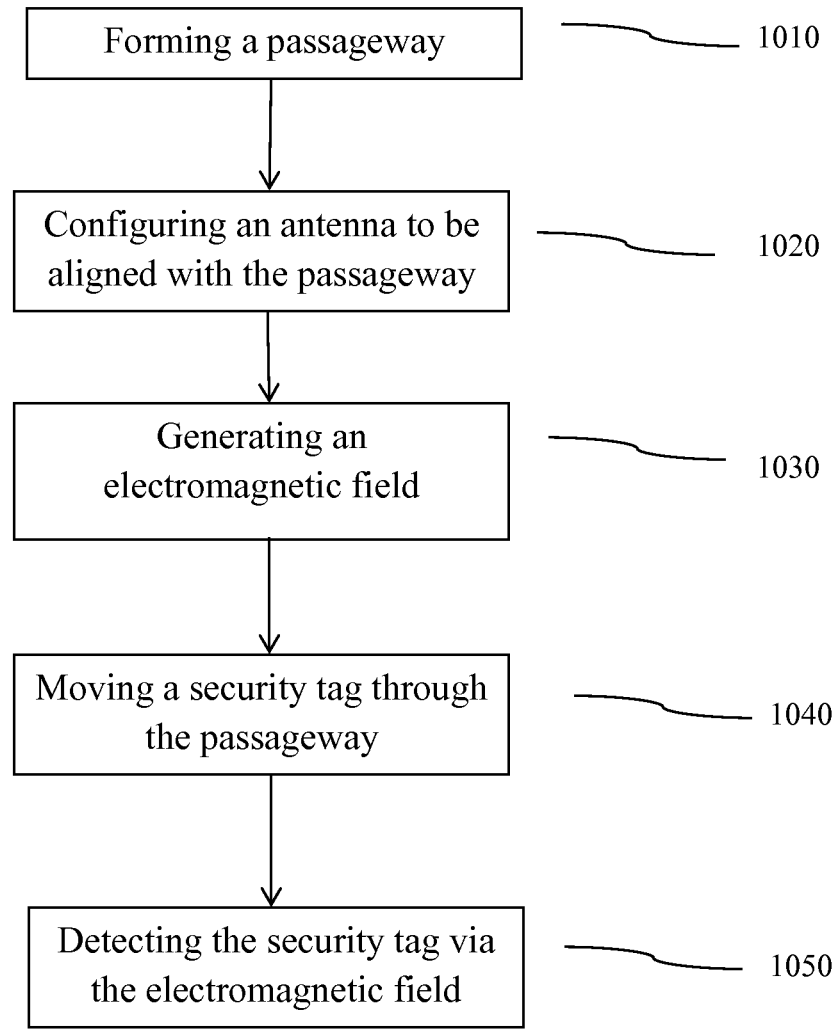
FIG. 9 illustrates a block diagram of an exemplary method of detecting and/or deactivating a security tag.

Reference is now directed to FIG. 9. FIG. 9 depicts a block diagram that shows an exemplary method of detecting and/or deactivating a security tag. The process is started at step 1010 by forming a passageway. The passageway may be shaped, for example, as a square, rectangle, circle, octagon, or any other shape in which an article may pass through. The passageway may further be formed of various sizes. In some examples, the passageway may be sized in such a way that the article and/or security tag barely fit through the passageway. In other examples, however, the passageway may be sized to be much larger than the security tag and/or article that is to be passed through the passageway. In still further examples, the passageway may be sized without regard to the size of the article.

At step 1020, an antenna is configured so that it aligns with the passageway. The antenna may, in some examples, align with all sides of the passageway. Thus, in one example, the antenna may align with all four sides of a passageway shaped as a square. In other examples, however, the antenna may align with less than all sides of the passageway, e.g., the antenna may align with three, or fewer, sides of a square passageway. Although a square is described as an example for alignment of an antenna, it should be understood that the antenna may align to any shape in which a passageway may be formed.

At step 1030, the antenna generates an electromagnetic field. The electromagnetic field may be used to detect the security tag, and/or to deactivate the security tag. In examples, the electromagnetic field may be used to perform additional functions known by those having skill in the art of electromagnetic fields. The electromagnet field may be generated, for example, from the front of the portal, from the back of the portal, or from a combination of the front and the back of the portal. The strength of the electromagnetic field may be high or low, depending, for example, on the power provided to the power current generator.

The security tag may next be moved through the passageway, as illustrated by step 1040. In preferred embodiments, the security tag moving through the passageway is attached to an article. The security tag, in some examples, may be moved through the passageway via a conveyance system. In these examples, the security tag may be moved in various directions, e.g., moved forward and/or in reverse along the conveyance system. In examples wherein there is no conveyance system, the security tag may be pushed or pulled through the passageway, etc. The security tag, prior to, during, or after passing through the passageway may be detected by the electromagnetic field, as shown in step 1050. In some examples, the electromagnetic field may deactivate the security tag in addition to, or instead of, detecting the security tag.

In other embodiments, the antenna may be used to read hard tags or tags of other frequency so as to distinguish from the security tags. In this example, the operator may be warned that a tag of another type, as for example a hard tag, is still located on the article of merchandise and that this type of tag will not be deactivated by the deactivation antennas in the deactivation portal. An antenna receiving high power from the current generator may only detect the presence of a hard tag, wherein otherwise the high power would deactivate the security tag, being a soft tag. Other types of tag deactivation devices, for other than EAS and RFID soft tags, may be configured to work in conjunction with the portal. In other embodiments, the antennas may detect or deactivate RFID security tags. For UHF RFID tags, any one of the antennas described for above may be replaced or work in conjunction with the round, patch-like antennas used for sensing UHF RFID security tags, to thus read the backscatter transmission of the RFID security tag including the EPC of the RFID security tag.

It is to be understood that the descriptions of this disclosure have been simplified to illustrate characteristics that are relevant for a clear understanding of the disclosure. Those of ordinary skill in the art may recognize that other elements or steps are desirable or required in implementing this disclosure. However, because such elements or steps are well known in the art, and because they do not facilitate a better understanding of the disclosure, a discussion of such elements or steps is not provided herein. The disclosure herein is directed to all such variations and modifications to such elements and methods known to those skilled in the art.

It is to be understood that the disclosure may assume various alternative orientations and step sequences, except where expressly specified to the contrary. It is also to be understood that the specific devices and processes illustrated in the attached drawings, and described in this specification are simply exemplary embodiments of the concepts defined in the appended claims. Hence, specific dimensions and other physical characteristics relating to the embodiments disclosed herein are not to be considered as limiting, unless the claims expressly state otherwise.

Further, since numerous modifications and changes will readily occur to those skilled in the art, it is not desired to limit the invention to the exact construction and operation shown and described, and accordingly all suitable modifications and equivalents may be regarded as falling within the scope of this disclosure as defined by the claims that follow.

What is claimed is:

1. An electronic article surveillance (EAS) system comprising:
   a current generator;
   an antenna coupled to the current generator to generate an electromagnetic field;
   a conveyance system to transfer an article through a passageway; and
   a direction detector configured to determine a direction of travel and a speed of the conveyance system,
   wherein the antenna is defined by sides, the sides of the antenna extending around the passageway so that the article having a security tag affixed thereto passes through the passageway and between the sides of the antenna, and wherein the electromagnetic field is used for at least one of sensing to detect the security tag or deactivating the security tag about the passageway.

2. The electronic article surveillance (EAS) system of claim 1, further comprising an additional antenna coupled to the current generator or an additional current generator to partially generate a portion of the electromagnetic field, wherein the additional antenna is configured to extend proximate to the passageway.

3. The electronic article surveillance (EAS) system of claim 2, wherein the additional antenna is further configured to extend around the passageway, wherein the antenna lies in a first plane and the additional antenna lies in a second plane, the first and second planes being substantially parallel to one another, and wherein the article passes through the passageway about which both the antenna and the additional antenna extend.

4. The electronic article surveillance (EAS) antenna of claim 3, wherein the antenna and the additional antenna are configured to be driven out-of-phase to improve far field cancellation of the electromagnetic field.

5. The electronic article surveillance (EAS) system of claim 2, wherein the electromagnetic field of the antenna deactivates the tag and the portion of the electromagnetic field of the additional antenna senses to detect the security tag.

6. The electronic article surveillance (EAS) system of claim 2, wherein the antenna lies in a first plane and the additional antenna lies in a second plane, the first and second planes being configured to cross one another, and wherein the article passes through the passageway about which both the antenna and the additional antenna extend.

7. The electronic article surveillance (EAS) system of claim 2, wherein the antenna lies in a first plane and the additional antenna lies in a second plane, the first and second planes being substantially perpendicular to one another, and wherein the article passes over the additional antenna and through the passageway about which the antenna extends.

8. The electronic article surveillance (EAS) system of claim 1 further comprising a controller coupled to the direction detector and the conveyance system, wherein the controller is configured to modify the operation of the conveyance system based on at least one of the direction of travel or the speed of the conveyance system determined by the direction director.

9. The electronic article surveillance (EAS) system of claim 1 further comprising a housing to support the at least one antenna, wherein the housing is shielded to absorb at least a portion of the electromagnetic field.

10. The electronic article surveillance (EAS) system of claim 9, wherein the housing further supports a scanner that scans a barcode on the article at approximately the same time that the article passes through the passageway.

11. An electronic article surveillance (EAS) portal comprising:
an antenna defined by sides, the sides of the antenna being configured to extend around a passageway for a security tag to pass through via a conveyance system in a predetermined direction of travel and speed which is determined by a direction detector,
wherein the antenna is further configured to emit an electromagnetic field for at least one of detecting the security tag or deactivating the security tag.

12. The electronic article surveillance (EAS) portal of claim 11, further comprising an additional antenna, wherein the additional antenna is configured to extend proximate to the passageway.

13. The electronic article surveillance (EAS) portal of claim 12, wherein the additional antenna is further configured to extend around the passageway, wherein the antenna lies in a first plane and the additional antenna lies in a second plane, the first and second planes being substantially parallel to one another, and wherein the article passes through the passageway about which both the antenna and the additional antenna extend.

14. The electronic article surveillance (EAS) portal of claim 12, wherein the antenna lies in a first plane and the additional antenna lies in a second plane, the first and second planes being substantially perpendicular to one another, and wherein the article passes over the additional antenna and through the passageway about which the antenna extends.

15. The electronic article surveillance (EAS) portal of claim 12, wherein the antenna lies in a first plane and the additional antenna lies in a second plane, the first and second planes being configured to cross one another, and wherein the article passes through the passageway about which both the antenna and the additional antenna extend.

16. A method, comprising:
forming a passageway;
configuring an antenna to be disposed such that sides of the antenna extend around the passageway;
generating, from the antenna, an electromagnetic field;
moving an article having a security tag affixed thereto through the passageway via a conveyance system;
determining a direction of travel and a speed of the conveyance system via a direction detector; and
detecting the security tag, or deactivating the security tag, via the electromagnetic field.

17. The method of claim 16, further comprising:
configuring an additional antenna to be proximate to the passageway; and
generating, from the additional antenna, another electromagnetic field.

18. The method of claim 17, further comprising:
forming the antenna in a first plane and the additional antenna in a second plane, the first and second planes being substantially parallel to each other and each extending around the passageway.

* * * * *